(12) United States Patent
Tochio

(10) Patent No.: US 6,563,613 B1
(45) Date of Patent: May 13, 2003

(54) OPTICAL SUBSCRIBER NETWORK, AND DELAY MEASUREMENT METHOD

(75) Inventor: Yuji Tochio, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/203,099

(22) Filed: Dec. 2, 1998

(30) Foreign Application Priority Data

Mar. 9, 1998 (JP) .......................................... 10-056560

(51) Int. Cl.[7] .............................................. H04B 10/08
(52) U.S. Cl. ...................... 359/110; 359/125; 359/157
(58) Field of Search .............................. 359/110, 125, 359/140, 161, 173, 124, 136, 177, 157; 340/310

(56) References Cited

U.S. PATENT DOCUMENTS

| | | | |
|---|---|---|---|
| 5,327,277 A | * 7/1994 | Van Der Plas et al. | 359/140 |
| 5,361,398 A | * 11/1994 | Christian et al. | 455/503 |
| 5,491,574 A | * 2/1996 | Shipley | 250/227.15 |
| 5,808,766 A | * 9/1998 | Van de Voorde et al. | 359/140 |
| 5,907,417 A | * 5/1999 | Darcie et al. | 359/110 |

FOREIGN PATENT DOCUMENTS

| | | | |
|---|---|---|---|
| JP | 7-30508 | 1/1995 | ............. H04J/3/00 |
| JP | 8-125638 | 5/1996 | ............. H04J/14/08 |

* cited by examiner

*Primary Examiner*—Leslie Pascal
*Assistant Examiner*—Christina Y Leung
(74) *Attorney, Agent, or Firm*—Staas & Halsey LLP

(57) ABSTRACT

In an optical subscriber network having a station, a plurality of subscriber units and an optical transmission line through which optical signals are sent and received by the station and plurality of subscriber units, (1) wavelengths $\lambda_1 - \lambda_n$ for delay time measurement are allocated respective ones of the subscriber units; (2) delay-measurement optical signals having these wavelengths are wavelength-multiplexed and transmitted, the number of these multiplexed optical signals being equivalent to the number of subscribers; (3) the wavelength-multiplexed delay-measurement optical signals are distributed to each of the subscriber units via a star coupler in the optical transmission line; (4) each subscriber unit selects, by wavelength selection, a delay-measurement optical signal having the wavelength that has been allocated to it, and loops back the selected optical signal; (5) the star coupler of the optical transmission line combines the delay-measurement optical signals returned from each of the subscriber units and sends the combined signals to the station; and (6) the station separates, according to each subscriber, the delay-measurement optical signals returned, and measures delay time to each subscriber unit based upon the time between transmission and receipt of the associated delay-measurement optical signal.

16 Claims, 12 Drawing Sheets

OPTICAL SUBSCRIBER NETWORK, AND DELAY MEASUREMENT METHOD

BACKGROUND OF THE INVENTION

This invention relates to an optical subscriber network having a delay measurement function, and to a delay measurement method. More particularly, the invention relates to a delay measurement method in an optical subscriber network having a station, a plurality of subscriber units and an optical transmission line through which optical signals are sent and received by the station and plurality of subscriber units.

A PON (Passive Optical Network) is one way of implementing an optical communications network that utilizes the broadband characteristic of optical fiber. An optical communications network of this kind is the focus of much attention as the network is ideal for providing multimedia services such as CATV and VOD (Video on Demand) to the home by way of optical fiber. A PON-implemented optical subscriber network generally has the configuration shown in FIG. 12. As shown in FIG. 12, the network comprises a station 1 such as a CATV station, subscribers (subscriber units) $2_1$–$2_n$, and an optical transmission line 3 which connects the station 1 with the homes of the subscribers using optical fibers 3a and a star coupler 3b to make possible the communication of main signals (video and audio signals as well as uplink/downlink control signals) in both directions.

Research utilizing wavelength multiplexing techniques to realize high-capacity transmission is being carried out in regard to optical subscriber networks of this kind, and transmission techniques using different wavelengths for downlink data (sent from station to subscriber) and uplink data (sent from subscriber to station) have been proposed. Techniques using wavelengths in the 1.55-$\mu$m band for downlink data and in the 1.3-$\mu$m band for uplink data are the focus of attention at the present time. Schemes for performing wavelength multiplexing in order to implement high-capacity transmission are being studied in regard to downlink data as well.

The same wavelength (e.g., a wavelength in the 1.3-$\mu$m band) is used for all subscribers in regard to uplink data. Consequently, unless some measures are taken, uplink data transmitted by the subscribers will collide within the optical transmission line and it will not be possible to demodulate the data correctly at the station. To this end, the station specifies the timing of uplink data transmission for each subscriber and causes the uplink data to be transmitted at these timings so that collision of the uplink data is avoided.

However, the distances between the subscribers and the station are not the same but differ for each subscriber. As a consequence, delay times that develop between the subscribers and the station differ for every subscriber and collision of uplink data will occur unless consideration is given to the disparity in delay times. For this reason, the station measures the distance to each subscriber, namely the delay time, and decides the transmission timings of the uplink signals on the basis of the measured delays.

FIG. 13 is a diagram useful in describing delay measurement according to the prior art. The station 1 sends an optical signal S1i (i=1, 2, . . . ) for downlink delay measurement separately to each subscriber 2i. Upon receiving the signal S1i, the subscriber executes processing at a termination and sends an optical signal S2i for uplink delay measurement back to the station 1. The station 1 then measures the time from the moment the optical signal for downlink delay measurement was sent to the moment the optical signal for uplink delay measurement was received and adopts this time as the delay time.

However, it is required that this conventional method of delay measurement be performed separately for each subscriber. A problem which arises is that measurement of delay takes too much time.

Further, with delay measurement according to the prior art, it is required that the processing method used for delay measurement be changed depending upon whether the subscriber unit is operating or not. This makes measurement a complicated task.

SUMMARY OF THE INVENTION

Accordingly, an object of the present invention is to arrange it so that delays associated with a plurality of subscribers can be measured simultaneously in a short period of time.

Another object of the present invention is to make possible the measurement of delay time irrespective of whether a subscriber unit is operating, and to improve the accuracy and reliability of delay measurement.

A further object of the present invention is to arrange it so that delay can be measured upon specifying one or more subscribers at will.

Yet another object of the present invention is to arrange it so that a failure such as cable severance can be detected and the point of failure identified.

The foregoing objects are attained by providing an optical subscriber network having a station, a plurality of subscriber units and an optical transmission line through which optical signals are sent and received by the station and plurality of subscriber units, in which (1) wavelengths for delay time measurement are allocated to respective ones of the subscriber units; (2) delay-measurement optical signals having the aforesaid wavelengths are wavelength-multiplexed and sent to the optical transmission line from the station, the number of wavelength-multiplexed optical signals being equivalent to the number of subscribers; (3) the wavelength-multiplexed delay-measurement optical signals are distributed to each of the subscriber units via a star coupler in the optical transmission line; (4) each subscriber unit selects, by wavelength selection a delay-measurement optical signal having the wavelength that has been allocated to it, and loops back the selected optical signal; (5) the star coupler of the optical transmission line combines the delay-measurement optical signals sent back from each of the subscriber units and sends the combined signals to the station; and (6) the station separates, according to each subscriber unit by wavelength selection, the delay-measurement optical signals sent back, and measures a phase difference or time difference between a transmitted delay-measurement optical signal and a received delay-measurement optical signal to thereby measure transmission distance or delay time to each subscriber unit. In other words, by changing a wavelength $\lambda i$ for delay time measurement for every subscriber unit, it is possible to measure transmission distances or delay times from a station to all subscriber units at one time. As a result, measurement time can be shortened and the measurement operation simplified.

Further, in accordance with the present invention, the foregoing embodiments are attained by providing an optical transmission apparatus, which is provided in a station, comprising (1) optical transmitters for transmitting delay-measurement optical signals having wavelengths allocated to respective ones of subscriber units; (2) wavelength multiplexing/demultiplexing means for wavelength-multiplexing and sending, to an optical transmission line, the delay-measurement optical signals output by the respective optical transmitters, the number of wavelength-multiplexed optical signals being equivalent to the number of subscribers, and for demultiplexing, according to each subscriber unit by wavelength selection, delay-measurement optical signals sent back from the subscriber units; (3) optical receivers for receiving delay-measurement optical signals having wavelengths allocated to respective ones of the subscriber units; and (4) means for instructing each optical transmitter to send a delay-measurement optical signal, monitoring receipt of a delay-measurement optical signal by each optical receiver and measuring, for each subscriber unit, time from transmission of a delay-measurement optical signal to reception of the delay-measurement optical signal as delay time. In accordance with this optical transmission apparatus on the side of the station, it is possible to measure transmission distances or delay times from the station to all subscriber units at one time. Moreover, by specifying one or more subscribers at will, the delays associated only with these subscribers can be measured.

Further, in accordance with the present invention, the foregoing embodiments are attained by providing an optical transmission apparatus, which is provided in a subscriber unit, comprising (1) an optical coupler connected to a transmission line; (2) wavelength selection means connected to the optical coupler for selecting a delay-measurement optical signal having a wavelength that has been allocated to it; (3) a fiber delay line for delaying, by an amount equivalent to signal length, a delay-measurement optical signal selected by the wavelength selection means; (4) an isolator connected to the fiber delay line for transmitting a delay-measurement optical signal in one direction only; and (5) means for inputting a delay-measurement optical signal from the isolator to the optical coupler. In accordance with this optical transmission apparatus, a delay-measurement optical signal can be extracted and looped back irrespective of whether a subscriber unit is operating. As a result, the optical transmission apparatus on the station side can measure delay without giving consideration to whether or not the subscriber unit is operating. Moreover, it is possible to improve the accuracy and reliability of delay measurement.

Further, the optical coupler in the optical transmission apparatus on the side of a subscriber can be eliminated by connecting the isolator of the optical transmission apparatus on the subscriber side to a star coupler provided in the optical transmission line.

Further, in response to non-arrival of delay-measurement optical signals from all subscribers even upon elapse of a fixed period of time following transmission of the delay-measurement optical signals, it is possible to determine (1) whether a fault has occurred in the optical transmission line between the station and the star coupler or (2), in regard to all subscribers, whether a fault has occurred in the optical transmission line between the star coupler and the subscriber units or in the fibers within the subscriber units.

Further, in case of non-arrival of a delay-measurement optical signal from a specific subscriber unit even upon elapse of a fixed period of time following transmission of the delay-measurement optical signal, it is possible to determine (1) whether a fault has occurred in the optical transmission line between the star coupler and the subscriber unit or (2) whether a fault has occurred in the fiber within the subscriber unit.

Further, by providing means for measuring delay via a main-signal channel within the station and within a subscriber unit, a delay-measurement optical signal can be sent from the station to the subscriber unit via the main-signal channel and precise identification of a fault location can be performed based upon the answer from the subscriber unit.

Other features and advantages of the present invention will be apparent from the following description taken in conjunction with the accompanying drawings.

DESCRIPTION OF THE PREFERRED EMBODIMENT (A) Overview of the Present Invention

Figure 1A:
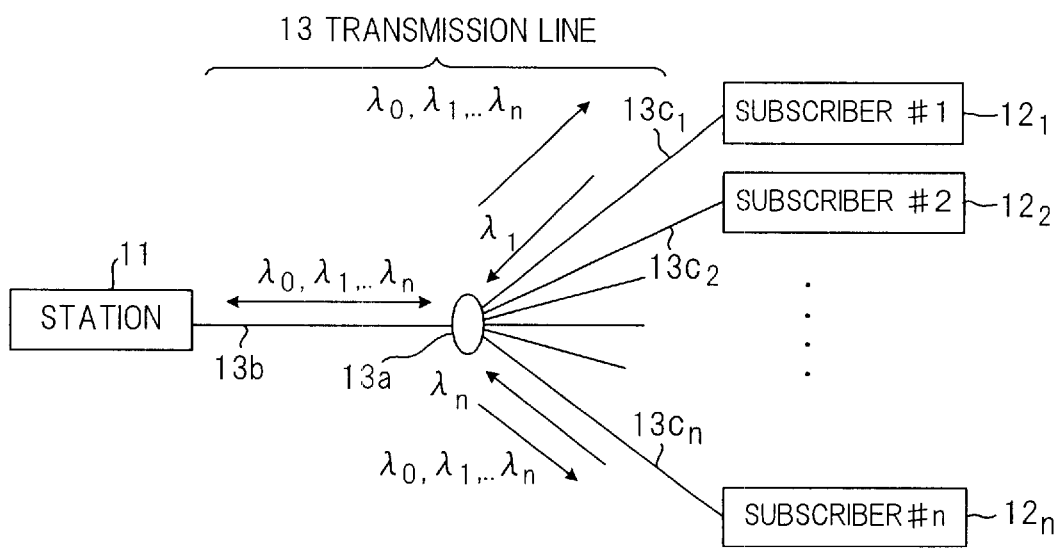
FIGS. 1A, 1B are diagrams useful in describing an overview of the present invention.
Figure 1B:
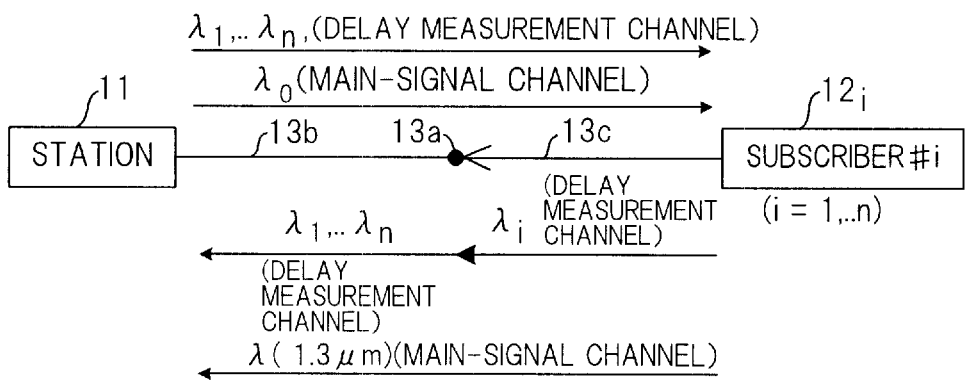

FIGS. 1A, 1B are diagrams useful in describing an overview of the present invention, in which FIG. 1A is a diagram showing the configuration of an optical subscriber network and FIG. 1B is a diagram for describing delay measurement according to the present invention.

Figure 11:
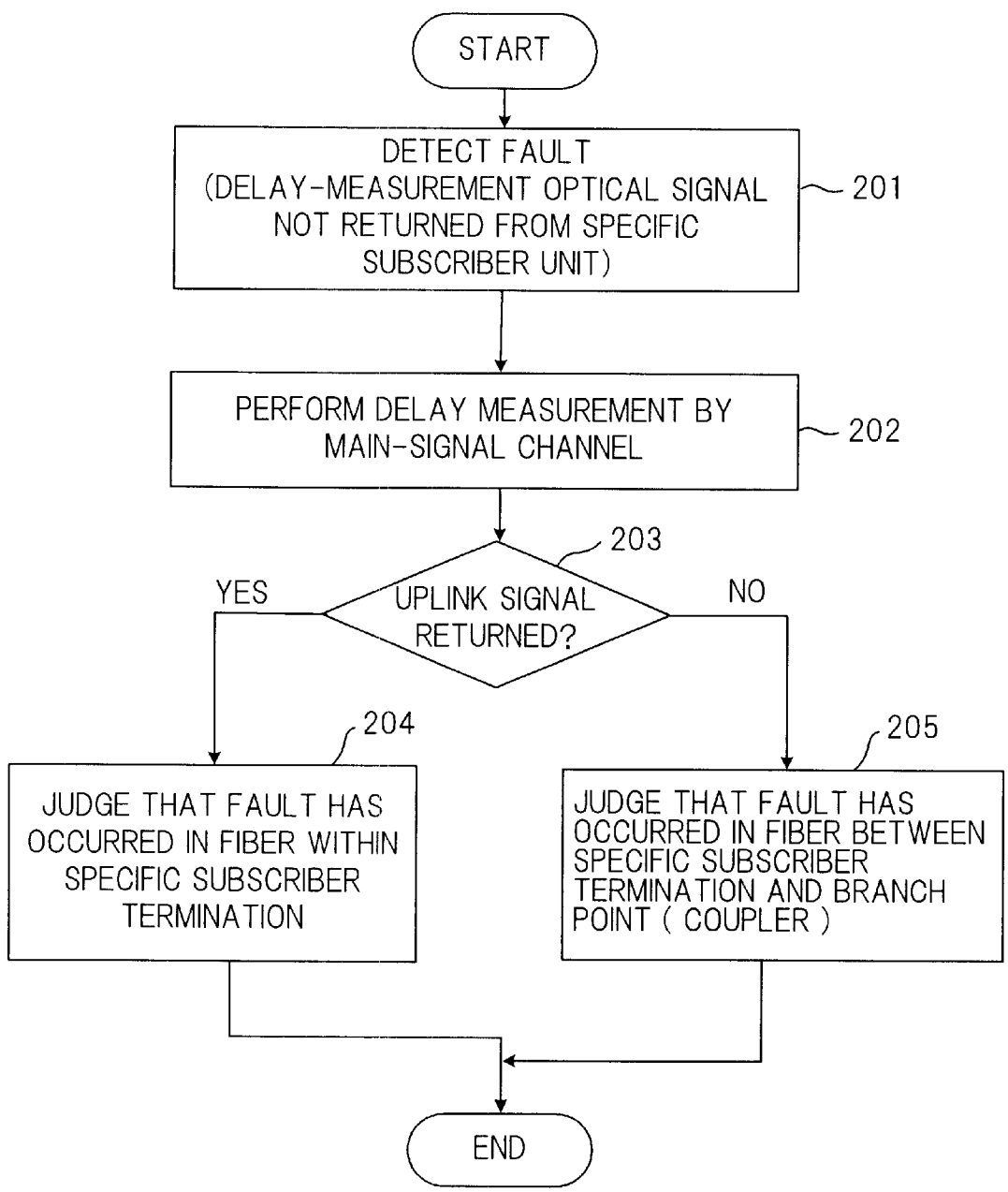
FIG. 11 is a flowchart of processing for identifying occurrence of a fault in a case where a delay-measurement optical signal is not returned from a specific subscriber unit.
Figure 12:
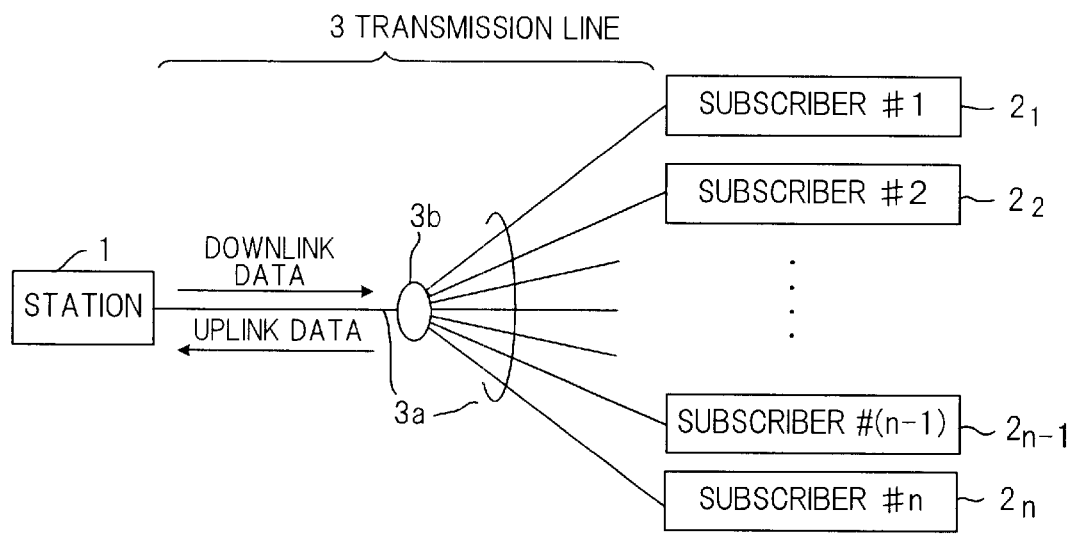
FIG. 12 is a diagram showing the configuration of an optical subscriber network.
Figure 13:
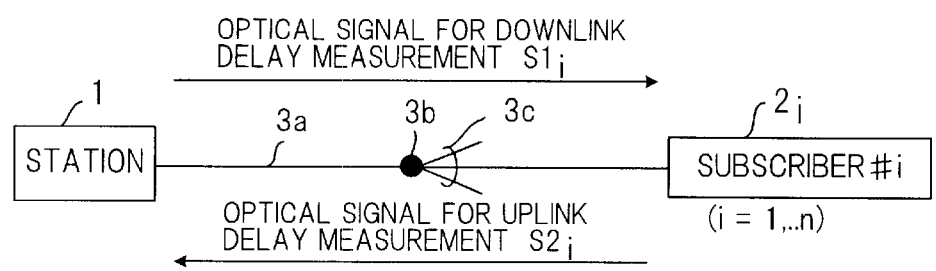
FIG. 13 is a diagram useful in describing delay measurement according to the prior art.

As shown in FIG. 11, the network comprises a station 11 having an optical transmission apparatus, a plurality of subscriber units (subscribers) $12_1$–$12_n$ each having an optical transmission apparatus, and a optical transmission line 13 through which optical signals are sent and received by the station and subscriber units. A star coupler 13a branches optical signals in a downlink direction and combines optical signals in an uplink direction, an optical cable 13b between the station 11 and the star coupler 13a, and optical cables $13c_1$–$13c_n$ connecting the star coupler 13a with each of the subscriber units.

There are two types of signals, namely a main signal (a downlink main signal from the station to a subscriber and an uplink main signal from a subscriber to the station) and an optical signal for measuring delay. Different wavelengths are allocated to these signals. For example, a wavelength of $\lambda_0$ (in the 1.55-μm band) is allocated to the downlink main signal, a wavelength of $\lambda$ (in the 1.3-μm band) to the uplink main signal and another wavelength to the delay-measurement optical signal. In addition, a different wavelength is assigned to each subscriber. For example, a wavelength $\lambda_i$ is allocated to an ith subscriber $12_i$ (i=1–n).

When delay is measured, the station 11 wavelength-multiplexes delay-measurement optical signals having wavelengths $\lambda_i$ (i=1–n) and sends the signals to the optical transmission line 13, wherein the number of wavelength-multiplexed optical signals sent is equivalent to the number of subscribers. The wavelength-multiplexed delay-measurement optical signals are distributed to each of the subscribers $12_i$ (i=1–n) via the star coupler 13 of the optical transmission line. Each subscriber unit $12_i$ selects, by wavelength selection, a delay-measurement optical signal having the wavelength $\lambda_i$ that has been allocated to it, and returns the selected optical signal to the star coupler 13a via a loopback path (not shown) provided internally. The star coupler 13a wavelength-multiplexes the delay-measurement optical signals of wavelengths $\lambda_i$ (i=1–n) sent back from each of the subscriber units and sends the wavelength-multiplexed signals to the station 11. The station 11 demultiplexes, according to each wavelength, i.e., each subscriber, the delay-measurement optical signals wavelength-multiplexed and sent back, and measures, as a time delay, the time from transmission of a delay-measurement optical signal to receipt of the delay-measurement optical signal.

Thus, delay measurement can be performed simultaneously for a plurality of subscribers by the wavelength multiplexing technique. Further, since the arrangement is a passive one, measurement is possible regardless of whether the receiving side is currently operating. Further, since transmission is point to point even in case of a burst signal, an extinction ratio on a par with that of the conventional trunk-line system is satisfactory, it is unnecessary to perform zero-biased modulation or the like and use of a burst supporting receiver is not required.

(B) Construction of Station

Figure 2:
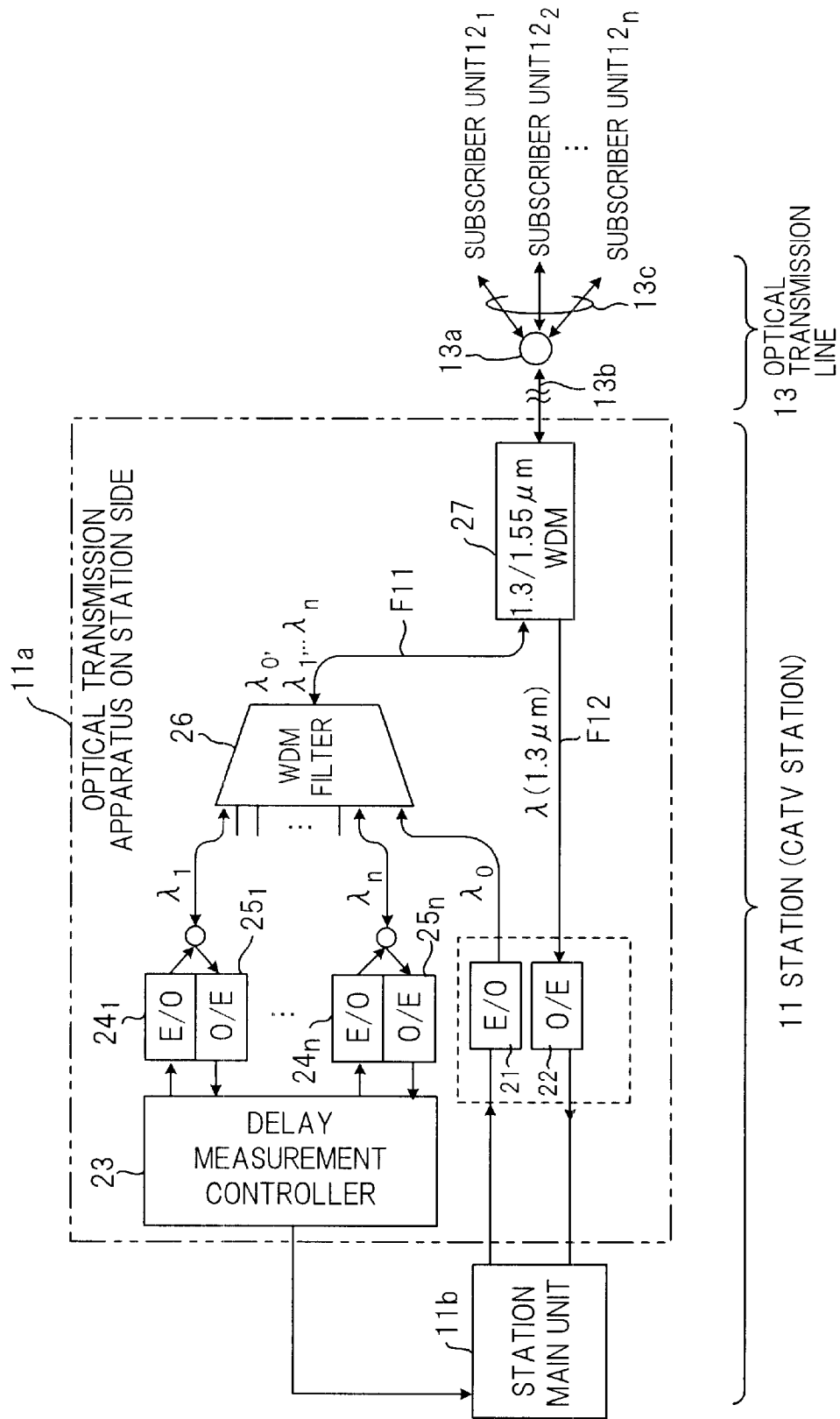
FIG. 2 is a diagram showing the construction of station equipment.

FIG. 2 is a diagram showing the construction of a station, e.g., a CATV station. Shown in FIG. 2 are an optical transmission apparatus 11a on the station side (a termination on the station side) and a station unit 11b for sensing and receiving main signals. The optical transmission apparatus 11a on the station side includes an optical transmitter 21 of a downlink main signal constructed by an electro-optic (E/O) transducer for converting the downlink main signal (an electric signal) to an optical signal of wavelength $\lambda_0$, and an optical receiver 22 of an uplink main signal constructed by an opto-electric (O/E) transducer for converting an optical signal of wavelength $\lambda$ to an uplink main signal (an electric signal). A delay measurement unit 23 controls the measurement of delays associated with each of the subscriber units. The optical transmission apparatus 11a further includes optical transmitters $24_1$–$24_n$ for delay measurement, which are constituted by opto-electric transducers, responsive to commands from the delay measurement unit 23 for transmitting delay-measurement optical signals having wavelengths $\lambda_1$–$\lambda_n$, respectively, allocated to the respective subscriber units (subscribers), and optical receives $24_1$–$24_n$ for delay measurement, which are constituted by electro-optic transducers, for converting delay-measurement optical signals having wavelengths $\lambda_1$–$\lambda_n$ looped back by the respective subscriber units to electric signals, which are then input to the delay measurement unit 23.

The optical transmission apparatus 11a further includes a first WDM (Wavelength Division Multiplexing) filter 26. In the downlink direction, the first WDM filter 26 multiplexes the downlink main signal of wavelength $\lambda_0$ and delay-measurement optical signals of wavelengths $\lambda_1$–$\lambda_n$ sent from the optical transmitters 21, $24_1$–$24_n$, respectively. In the uplink direction, the first WDM filter 26 demultiplexes the delay-measurement optical signals of wavelengths $\lambda_1$–$\lambda_n$ looped back by the respective subscriber units and inputs the demultiplexed signals to the optical receivers $25_1$–$25_n$. A second WDM filter 27 sends the multiplexed signals of wavelengths $\lambda_0$, $\lambda_1$–$\lambda_n$ in the downlink direction to the optical cable 13b, demultiplexes the uplink main signal of wavelength $\lambda$ and delay-measurement optical signals of wavelengths $\lambda_1$–$\lambda_n$ from the optical signal in the uplink direction input from the optical cable 13b, sends the demultiplexed uplink main signal of wavelength $\lambda$ to an optical fiber F12 and sends the demultiplexed delay-measurement optical signals of wavelengths $\lambda_1$–$\lambda_n$ to an optical fiber F11.

When the delays of the subscriber units $12_1$–$12_n$ (see FIG. 1) are to be measured, the delay measurement unit 23 instructs the optical transmitters $24_1$–$24_n$ to send the optical signals for delay measurement. In response to being so instructed, the optical transmitters $24_1$–$24_n$ send the delay-measurement optical signals of wavelengths $\lambda_1$–$\lambda_n$ allocated to the units $12_1$–$12_n$. The first WDM filter 26 multiplexes the downlink main signal of wavelength $\lambda_0$ and delay-measurement optical signals of wavelengths $\lambda_1$–$\lambda_n$ and sends the wavelength-multiplexed signals to the optical transmission line 13 via the second WDM filter 27. The signal is branched by the star coupler 13a so as to be sent to each of the subscriber units $12_1$–$12_n$. Each subscriber unit $12_i$ selects, from the wavelength-multiplexed signals by wavelength selection, a delay-measurement optical signal having the wavelength $\lambda_i$ that has been allocated to it, and returns the selected optical signal to the star coupler 13a via a loopback path provided internally. The star coupler 13a combines the delay-measurement optical signals of wavelengths $\lambda_i$ (i=1–n) sent back from each of the subscriber units and the uplink main signal of wavelength $\lambda$ and sends the resultant signal to the station 11 via the optical cable 13b.

The second WDM filter 27 of station 11 demultiplexes the uplink main signal of wavelength $\lambda$ and delay-measurement optical signals of wavelengths $\lambda_1$–$\lambda_n$ from the optical signal input from the optical cable 13b, sends the demultiplexed uplink main signal of wavelength $\lambda$ to an optical fiber F12 and sends the demultiplexed delay-measurement optical signals of wavelengths $\lambda_1$–$\lambda_n$ to an optical fiber F11. The first WDM filter 26 demultiplexes the delay-measurement optical signals of wavelengths $\lambda_1$–$\lambda_n$ from the optical signal input from the optical fiber F11 and inputs the demultiplexed signals to the optical receivers $25_1$–$25_n$. The optical receivers $25_1$–$25_n$ convert the delay-measurement optical signals to electric signals and input the electric signals to the delay measurement unit 23. The delay measurement unit 23 measures, in regard to each subscriber unit, the period of time from transmission of the delay-measurement optical signal to receipt of the delay-measurement optical signal and preserves this period of time as the delay time. It should be noted that the distance to the subscriber unit can be calculated from the transmission speed of the delay-measurement optical signal and the delay time. On the basis of the delay time measured, the station 11b decides and gives notice of the transmission timing of the uplink main signal of each subscriber unit. As a result, the uplink main signals from the subscriber units will no longer collide.

(C) Construction of Subscriber Unit

Figure 3:
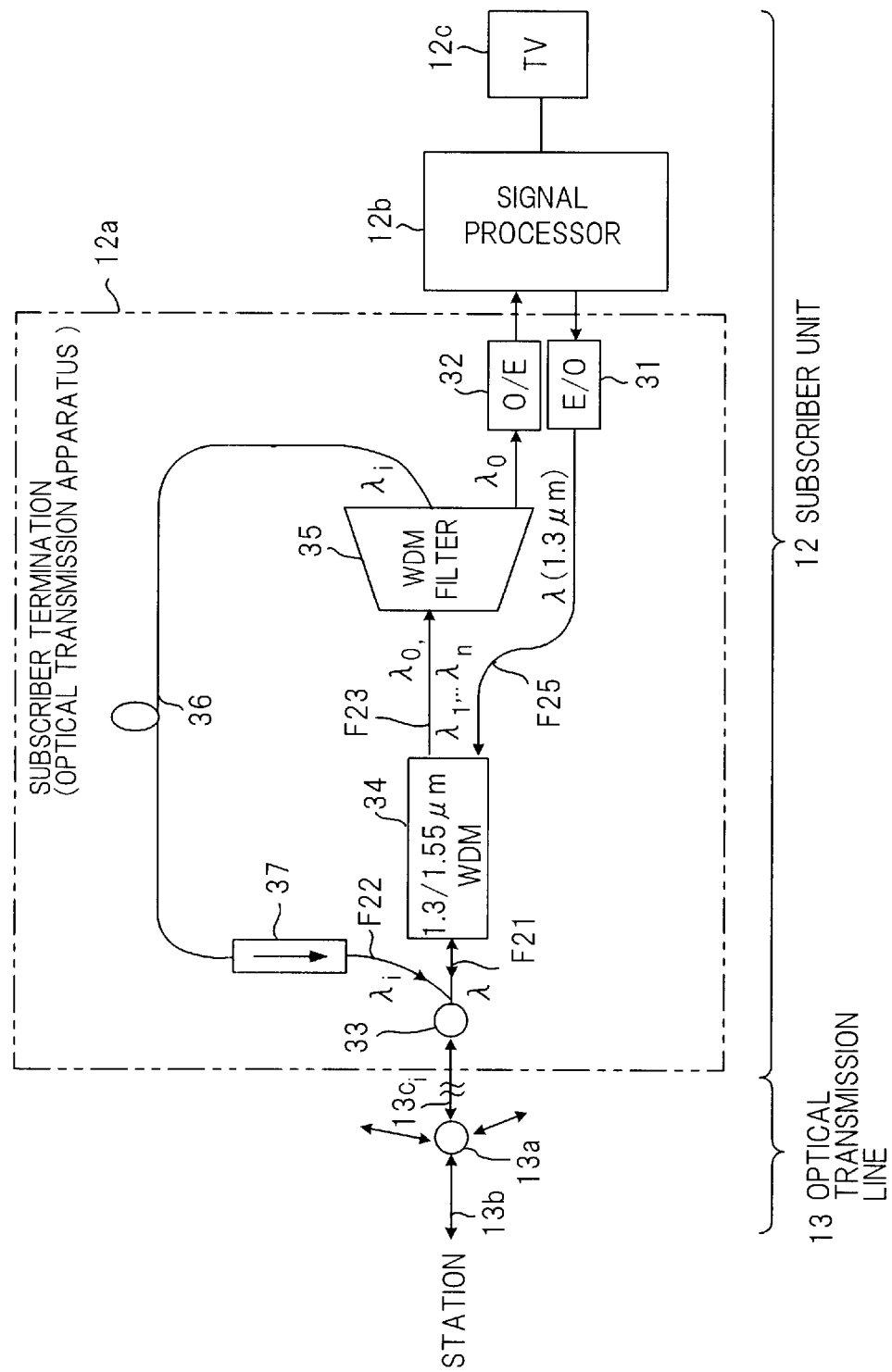
FIG. 3 is a diagram showing the construction of subscriber equipment.

FIG. 3 is a diagram showing the construction of a subscriber unit. The subscriber unit includes a subscriber termination (optical transmission apparatus) 12a which supervises the sending and receiving of optical signals, a signal processor 12b and a television (TV) 12c. The subscriber termination 12a includes an optical transmitter 31 of an uplink main signal constructed by an electro-optic transducer for converting the uplink main signal (an electric signal) to an optical signal of wavelength $\lambda$ (=1.3 $\mu$m), and an optical receiver 32 of a downlink main signal constructed by an opto-electric transducer for converting an optical signal of wavelength $\lambda_0$ to a downlink main signal (an electric signal). An optical coupler 33 is connected to an optical cable 13c. In the downlink direction, the optical coupler 33 sends an optical fiber F21 the wavelength-multiplexed signals of wavelengths $\lambda_0, \lambda_1-\lambda_n$ input from the optical cable 13c. In the downlink direction, the optical coupler 33 combines the wavelengths $\lambda$, $\lambda_i$, which have entered from optical fibers F21, F22, respectively, and sends the resultant signal to the optical cable 13c.

The subscriber termination 12a further includes a first WDM filter 34 for sending an optical fiber F23 the multiplexed optical signals of wavelengths $\lambda_0, \lambda_1-\lambda_n$ input from the optical coupler 33 via optical fiber F21, and for sending the optical fiber F21 the uplink main signal of wavelength $\lambda$ input from the optical transmitter 31. A second WDM filter 35 demultiplexes the downlink main signal of wavelength $\lambda_0$ and the delay-measurement optical signal of wavelength $\lambda_i$, which has been allocated to this subscriber unit, from the multiplexed signals of wavelengths $\lambda_0, \lambda_1-\lambda_n$ input from the optical fiber F23, inputs the downlink main signal of wavelength $\lambda_0$ to the optical receiver 32 and sends the delay-measurement optical signal of wavelength $\lambda_i$ to an optical fiber 36. An isolator 37, which is connected to the optical fiber 36, sends the delay-measurement optical signal of wavelength $\lambda_i$ in one direction only and inputs the signal to the optical coupler 33. The optical fiber 36 delays the delay-measurement optical signal by an amount equivalent to the signal length. The optical fiber 36 is for the purpose of assuring that a delay-measurement optical signal looped back and returned to the optical coupler 33 will not overlap an optical signal prior to its delay. If the transmission speed is 155 MB/s and delay is measured in terms of a single bit, then a length of 2 m will suffice for the optical fiber 36.

When delay is measured, the optical signals of wavelengths $\lambda_0, \lambda_1-\lambda_n$ are input to the subscriber units $12_1-12_n$ from the optical transmission apparatus on the station side (see FIG. 2) via the optical transmission line 13. The optical signals of wavelengths $\lambda_0, \lambda_1-\lambda_n$ are input to the second WDM filter 35 via the optical coupler 33, optical fiber F21, first WDM filter 34 and optical fiber F23 in the order mentioned. The second WDM filter 35 demultiplexes the downlink main signal of wavelength $\lambda_0$ and the delay-measurement optical signal of wavelength $\lambda_i$, which has been allocated to this subscriber unit, from the multiplexed signals, inputs the downlink main signal of wavelength $\lambda_0$ to the optical receiver 32 and sends the delay-measurement optical signal of wavelength $\lambda_i$ to an optical fiber 36. Thereafter, the delay-measurement optical signal of wavelength $\lambda_i$ is subjected to a predetermined delay by the optical fiber 36 and is returned to the star coupler 13a via the isolator 37 and optical coupler 33. The star coupler 13a combines the delay-measurement optical signals of wavelengths $\lambda_i$ (i=1-n) returned from each of the subscriber units $12_1-12_n$ and sends the resultant signal to the station 11 via the optical cable 13b.

Figure 4:
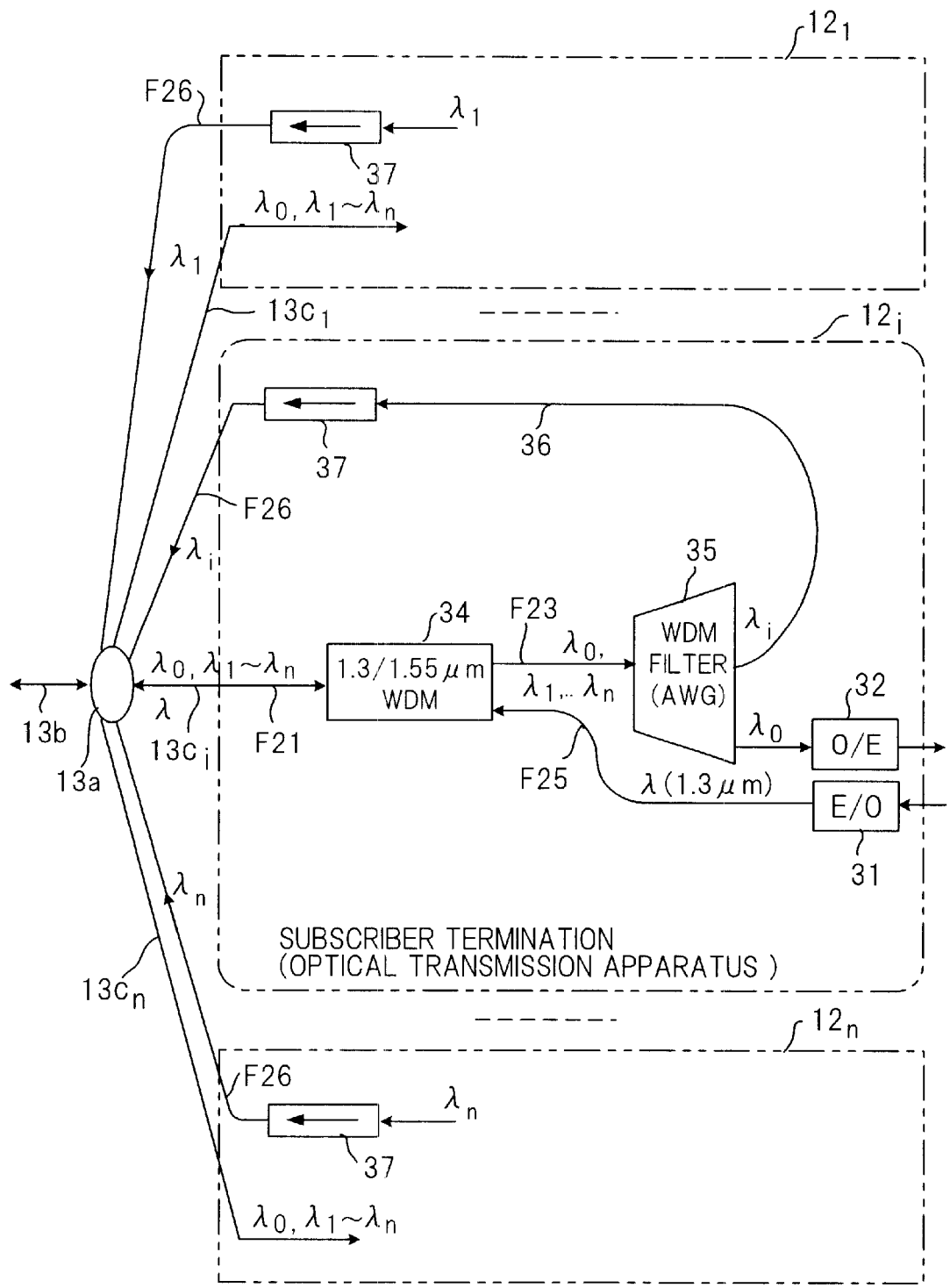
FIG. 4 is a diagram showing the construction of a subscriber termination.

The foregoing relates to a case where the optical coupler 33 is provided and the delay-measurement optical signal of wavelength $\lambda i$ is looped back to the optical coupler 33. However, an arrangement can be adopted in which the delay-measurement optical signal is returned to the star coupler 13a. FIG. 4 is a diagram illustrating another construction of the subscriber termination (optical transmission apparatus on the subscriber side) in such case. Here components identical with those shown in FIG. 3 are designated by like reference characters. This arrangement differs from that of FIG. 3 in that the optical coupler 33 is eliminated, the optical cables $13c_1-13c_n$ are connected directly to the first WDM filter 34, and the output of the isolator 37 is returned to the star coupler 13a. If this arrangement is adopted, it is possible to dispense with the optical coupler 33 (FIG. 3). Moreover, since sufficient length is obtained, delay need no longer be taken into account in terms of the fiber 36.

(D) Delay Measurement Controller

Figure 5:
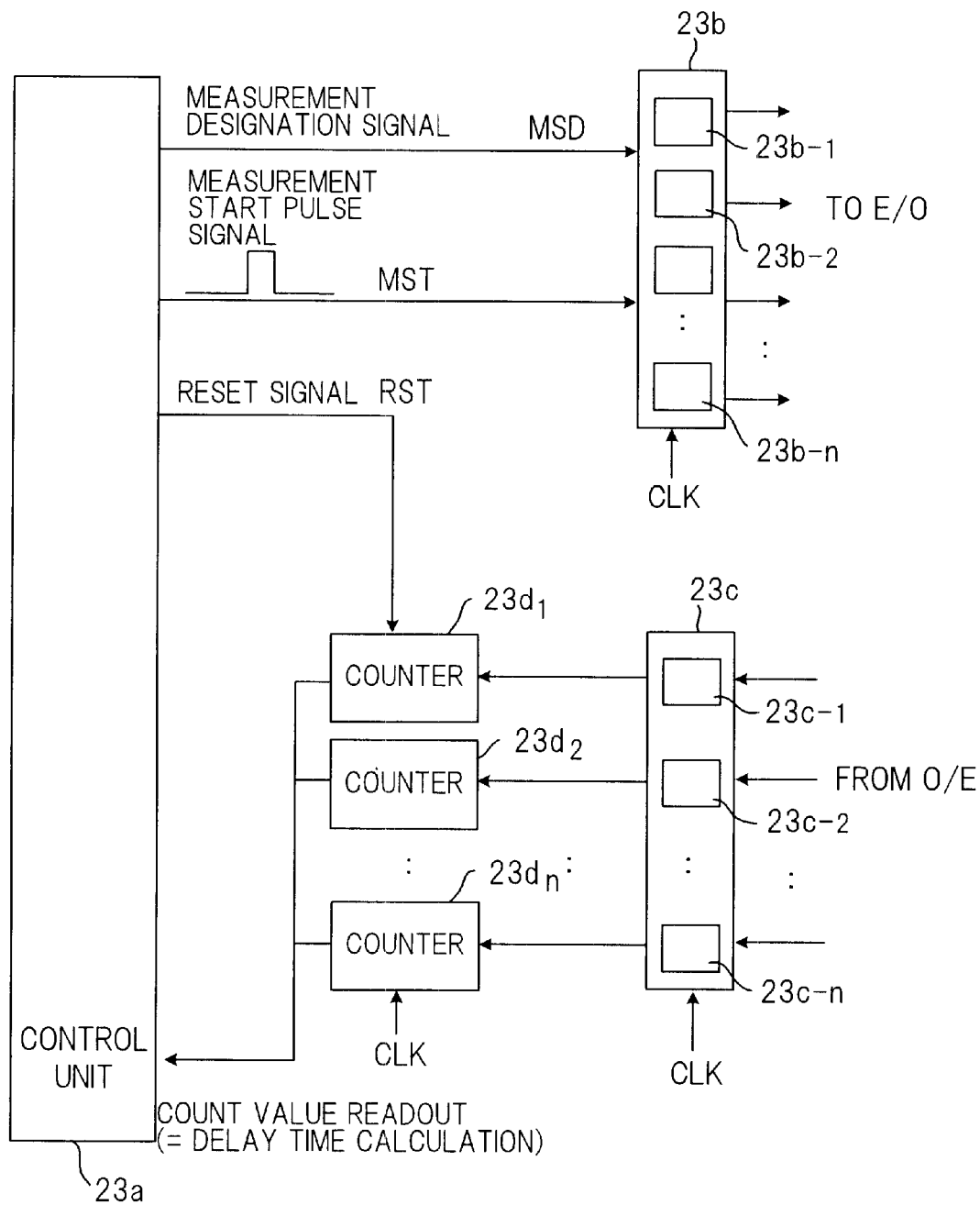
FIG. 5 is a diagram showing the construction of a delay measurement controller.

FIG. 5 is a diagram showing the construction of the delay measurement unit 23 (FIG. 2) provided in the optical transmission apparatus 11a on the station side. A control unit 23a specifies a prescribed subscriber unit and controls measurement of its delay. The control unit 23a generates a measurement designation signal MSD for designating a plurality of subscriber units to undergo measurement of delay time, a measurement start pulse signal MST for designating start of delay measurement and a counter reset signal RST, and calculates delay time upon reading the value of a count recorded by a counter, described later. A measurement start setting unit 23b has flip-flops 23b-1 through 23b-n corresponding to respective ones of the subscriber units. When any of the flip-flops 23b-1 through 23b-n are set by the measurement start pulse signal MST, the optical transmitters $24_1-24_n$ (FIG. 2) corresponding to the set flip-flops output delay-measurement optical signals of the prescribed wavelengths. An arrival monitoring unit 23c, which monitors arrival of delay-measurement optical signals, has flip-flops 23c-1 through 23c-n corresponding to respective ones of the subscriber units. The flip-flops 23c-1 through 23c-n are set when delay-measurement optical signals return to the optical receivers $25_1-25_n$ (FIG. 2) at the time of delay measurement. Counters 23d-1 through 23d-n correspond to respective ones of the subscriber units. The counters 23d-1 through 23d-n start counting a clock CLK in response to generation of the measurement start pulse signal MST (in response to transmission of the delay-measurement optical signals) and cease counting the clock when the delay-measurement optical signals return from the corresponding subscriber units.

When delay is measured, the control unit 23a specifies one or more subscriber units by the measurement designation signal MSD (all subscriber units can be made the object of measurement as a matter of course) and generates the measurement start pulse signal MST. In response, the flip-flops 23b-1 through 23b-n that correspond to the specified subscriber units are set and the corresponding optical transmitters $24_1-24_n$ (FIG. 2) output the delay-measurement optical signals of prescribed wavelengths $\lambda_1-\lambda_n$. Concurrently, the counters 23d-1 through 23d-n are cleared of their content and start counting the clock CLK. The delay-measurement optical signals of prescribed wavelengths $\lambda_1-\lambda_n$ output by the prescribed optical transmitters $24_1-24_n$ are sent to each of the subscriber units and are returned to the optical receivers $25_1-25_n$ (FIG. 2) of the optical transmission apparatus on the station side via the loopback paths within these subscriber units. The times at which the signals return to the optical receivers $25_1$–$25_n$ differ from one another depending upon the distances to the subscriber units. If the delay-measurement optical signals return, the optical receivers $25_1$–$25_n$ generate electric signals to set the flip-flops 23c-1 through 23c-n and the counters 23d-1 through 23d-n corresponding to the set flip-flops stop counting the clock.

Thus, the counters 23d-1 through 23d-n indicate count values that conform to times from transmission of the delay-measurement optical signals to loopback and return of these delay-measurement optical signals by the corresponding subscriber units. A prescribed period of time after measurement starts, the control unit 23a reads, as delay times, the count values recorded by the counters 23d-1 through 23d-n of the subscribers undergoing measurement and calculates as necessary the transmission distances to the subscriber units based upon the bit rates and delay times.

Figure 6:
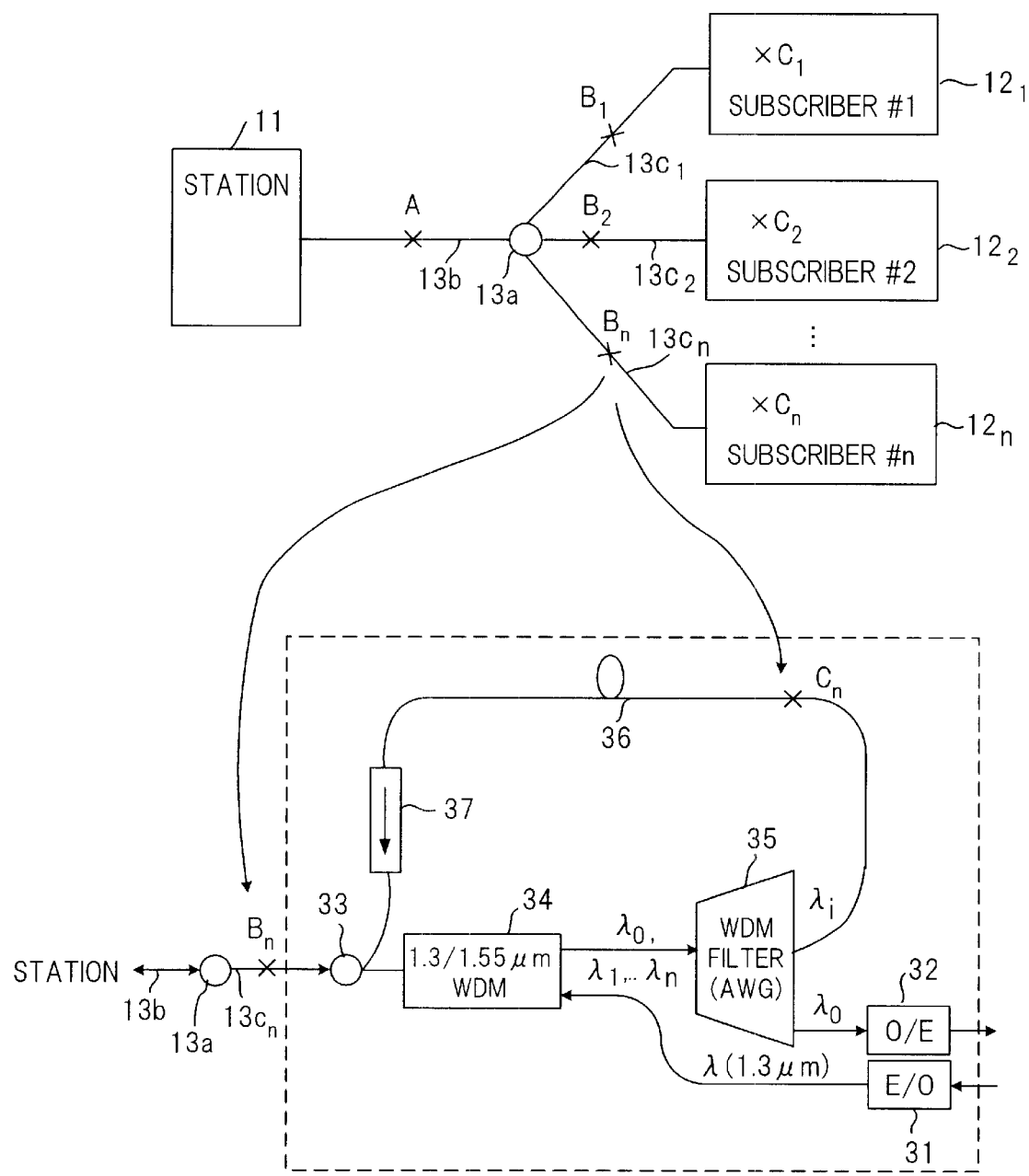
FIG. 6 is a diagram useful in describing points at which faults occurs.

(E) Fault Detection by Delay Measurement Controller (e-1) Description of Fault Detection FIG. 6 is a diagram useful in describing detection of points at which faults occur.

If a delay-measurement optical signal does not arrive at the station 11 from any subscriber upon elapse of a fixed period of time when delay measurement is carried out, then it is judged that (1) a fault has occurred at point A in the optical transmission line 13b between the station 11 and the star coupler 13a or that (2) faults have occurred at points $B_1$–$B_n$ in the optical transmission lines $13c_1$–$13c_n$ between the star coupler 13a and all subscriber units $12_1$–$12_n$ or at points $C_1$–$C_n$ in the loopback paths within the respective subscriber units.

If a delay-measurement optical signal does not arrive at the station 11 from a specific subscriber unit 12i upon elapse of a fixed period of time following transmission of a delay-measurement optical signal when delay measurement is carried out, then it is judged that a fault has occurred (1) at point $B_i$ in an optical transmission line $13c_i$ between the star coupler 13a and the subscriber unit $12_i$ or (2) at a point $C_i$ in the loopback path within the subscriber unit 12i.

Figure 7:
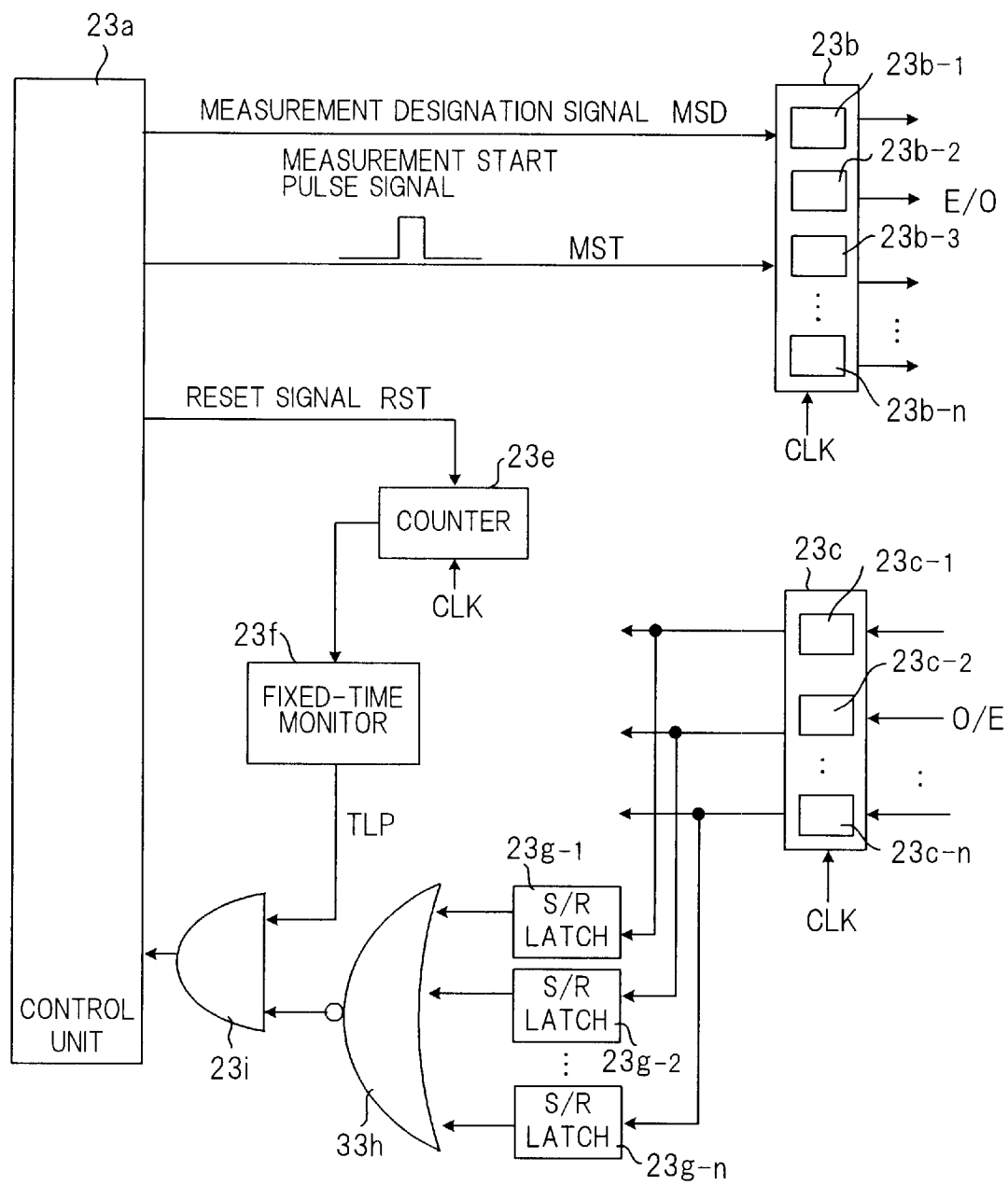
FIG. 7 is a diagram showing the construction of a fault detector for detecting a fault due to which a delay-measurement optical signal is not returned from any subscriber unit.

(e-2) When a Delay-measurement Optical Signal Does Not Arrive From Any Subscriber Unit FIG. 7 is a diagram of an embodiment in which the delay measurement unit 23 (see FIG. 2) is provided with a fault detection function for detecting a fault due to which a delay-measurement optical signal is not returned from any subscriber unit. Components in FIG. 7 identical with those shown in FIG. 5 are designated by like reference characters.

A counter 23e has its content reset to zero by the start of delay measurement and subsequently starts counting the clock CLK. A fixed-time monitor 23f performs monitoring to determine whether the value of the count recorded by the counter 23e has attained a fixed value conforming to a set time and, when the fixed value is attained, outputs a high-level signal TLP indicating elapse of the fixed period of time. S/R latch circuits 23g-1 through 23g-n correspond to the subscriber units. These circuits are reset initially and are set when delay-measurement optical signals are returned from the corresponding subscriber units. The outputs of the latch circuits are input to a NOR gate 33h, and the output of the NOR gate 33h is input to an AND gate 23i.

If a delay-measurement optical signal does not return from any subscriber unit upon elapse of a fixed period of time following the start of delay measurement, then all of the S/R latch circuits 23g-1 through 23g-n remain in the reset state. Consequently, the output of the NOR gate 33h attains the high level and so does the output of the AND gate 23i.

In response to the high level at the output of the AND gate 23i, the control unit 23a judges (1) that a fault has occurred in the optical transmission line 13b between the station side and the star coupler 13a or (2) that faults have occurred in the optical transmission lines between the star coupler 13a and all of the subscriber units or in the loopback paths within the subscriber units (see FIG. 6).

Figure 8:
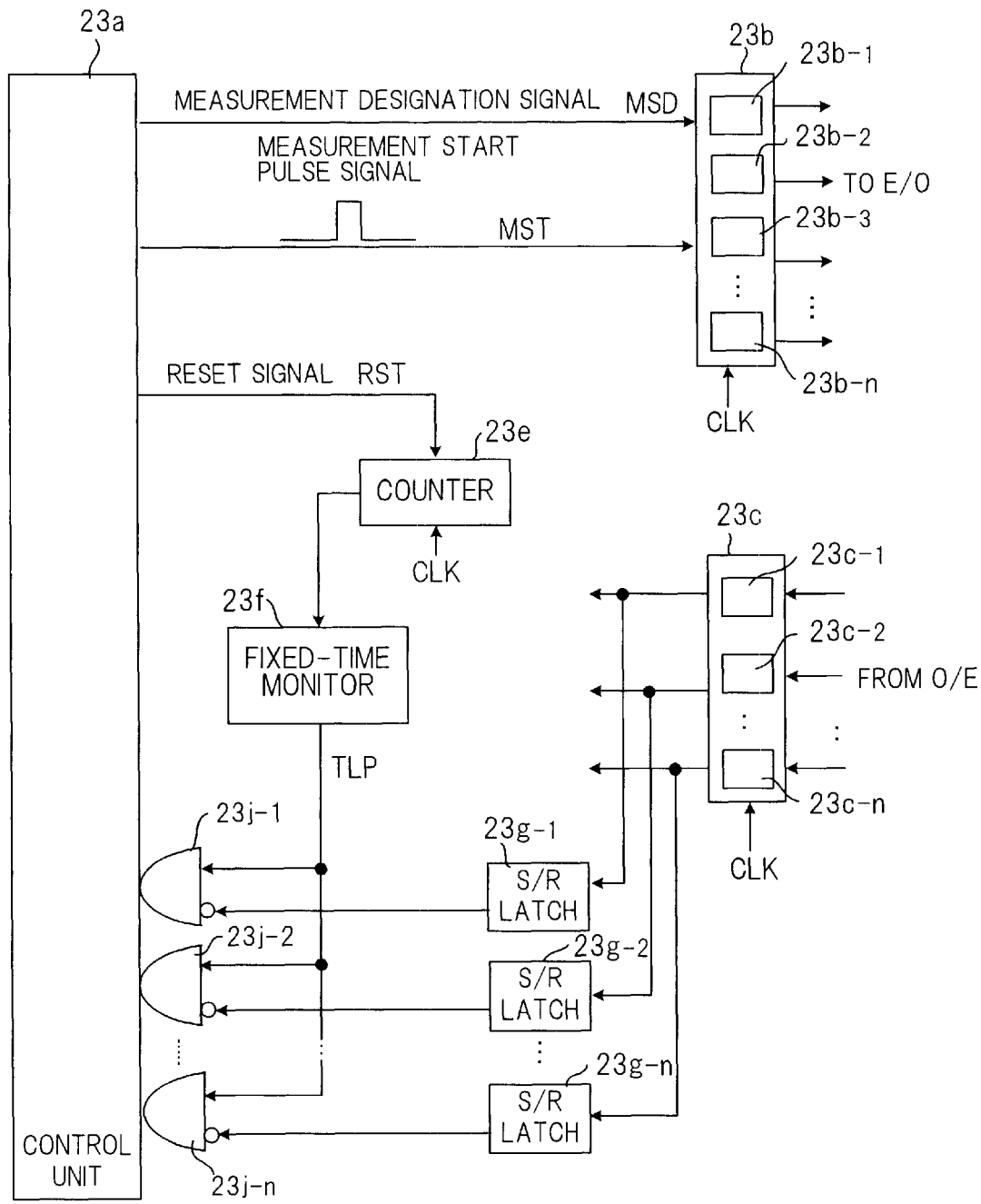
FIG. 8 is a diagram showing the construction of a fault detector for detecting a fault due to which a delay-measurement optical signal is not returned from a certain item of subscriber equipment.

(e-3) When a Delay-measurement Optical Signal Does Not Arrive From a Specific Subscriber Unit FIG. 8 is a diagram of an embodiment in which the delay measurement unit 23 (see FIG. 2) is provided with a fault detection function for detecting a fault due to which a delay-measurement optical signal is not returned from a specific subscriber unit. Components in FIG. 8 identical with those shown in FIG. 7 are designated by like reference characters.

This arrangement differs from that of FIG. 7 in the provision of AND gates 23j-1 through 12j-n for determining, in regard to individual subscriber units, when delay-measurement optical signals have returned following elapse of a fixed period of time from the start of delay measurement. The signal TLP indicative of elapse of the fixed time period is input to one input terminal of each of the AND gates 23j-1 through 12j-n, and the S outputs of the corresponding S/R latch circuits 23g-1 through 23g-n are input to the other input terminals of these AND gates. Accordingly, if a subscriber unit that has not returned a delay-measurement optical signal upon elapse of the fixed period of time from the start of delay measurement exists (assume that the subscriber unit $12_1$ is such a subscriber unit), then the S/R latch circuits 23g-1 corresponding to this subscriber unit is not set and the output of the corresponding AND gate 23j-1 attains the high level. As a result, the delay measurement unit 23 judges (1) that a fault has occurred in the optical transmission line between the star coupler 13a and the subscriber unit $12_1$ or (2) that a fault has occurred in the fiber within the subscriber unit $12_1$.

(e-4) Precise Identification of Fault Location

In a case where a delay-measurement optical signal does not arrive from any subscriber unit and in a case where a delay-measurement optical signal does not arrive from a specific subscriber unit, maintenance will be facilitated and can be performed more quickly if the point at which the fault occurred can be identified. Accordingly, a delay-measurement optical signal is sent to a subscriber unit from the station 11 via the main signal channel to make possible the precise identification of the faulty location based upon whether the station receives an answer signal from this subscriber unit.

Figure 9:
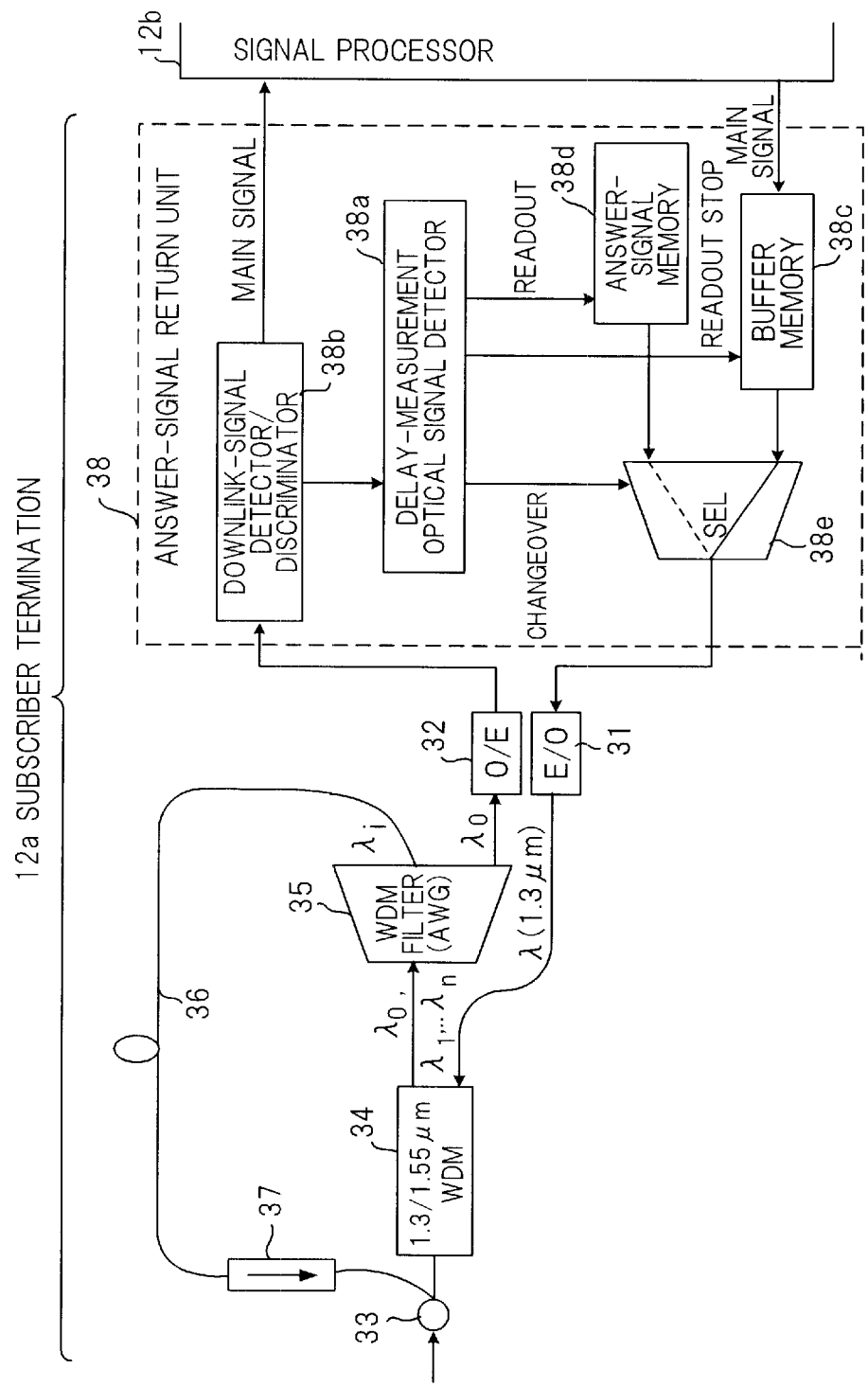
FIG. 9 is a diagram showing the construction of a subscriber termination equipped with a function for identifying a point at which a fault has occurred.

FIG. 9 is a diagram showing the construction of the subscriber termination 12a that makes possible delay measurement by the main signal channel. Here the subscriber termination 12a includes an answer-signal return unit 38 which, upon receiving a delay-measurement optical signal sent from the station 11 via the downlink main-signal channel, sends an answer signal back to the transmission apparatus on the station side via the uplink main-signal channel.

The answer-signal return unit 38 includes a delay-measurement optical signal detector 38a for outputting various signals upon detecting whether the main signal is a delay-measurement optical signal; a downlink-signal detector/discriminator 38b for detecting and discriminating a downlink main signal and inputting the result to the signal processor 12b and delay-measurement optical signal detector 38a; a buffer 38c for storing the uplink main signal that enters from the signal processor 12b; a memory 38d for storing the answer signal (an uplink delay-measurement optical signal) that is in response to the delay-measurement optical signal; and a selector 38e. Under normal conditions, the selector 38e selects and inputs to the optical transmitter 31 the uplink main signal that has been stored in the buffer memory 38c. When the delay-measurement optical signal has been detected, the selector 38e selects and inputs to the optical transmitter 31 the uplink delay-measurement optical signal that has been stored in the memory 38d.

Figure 10:
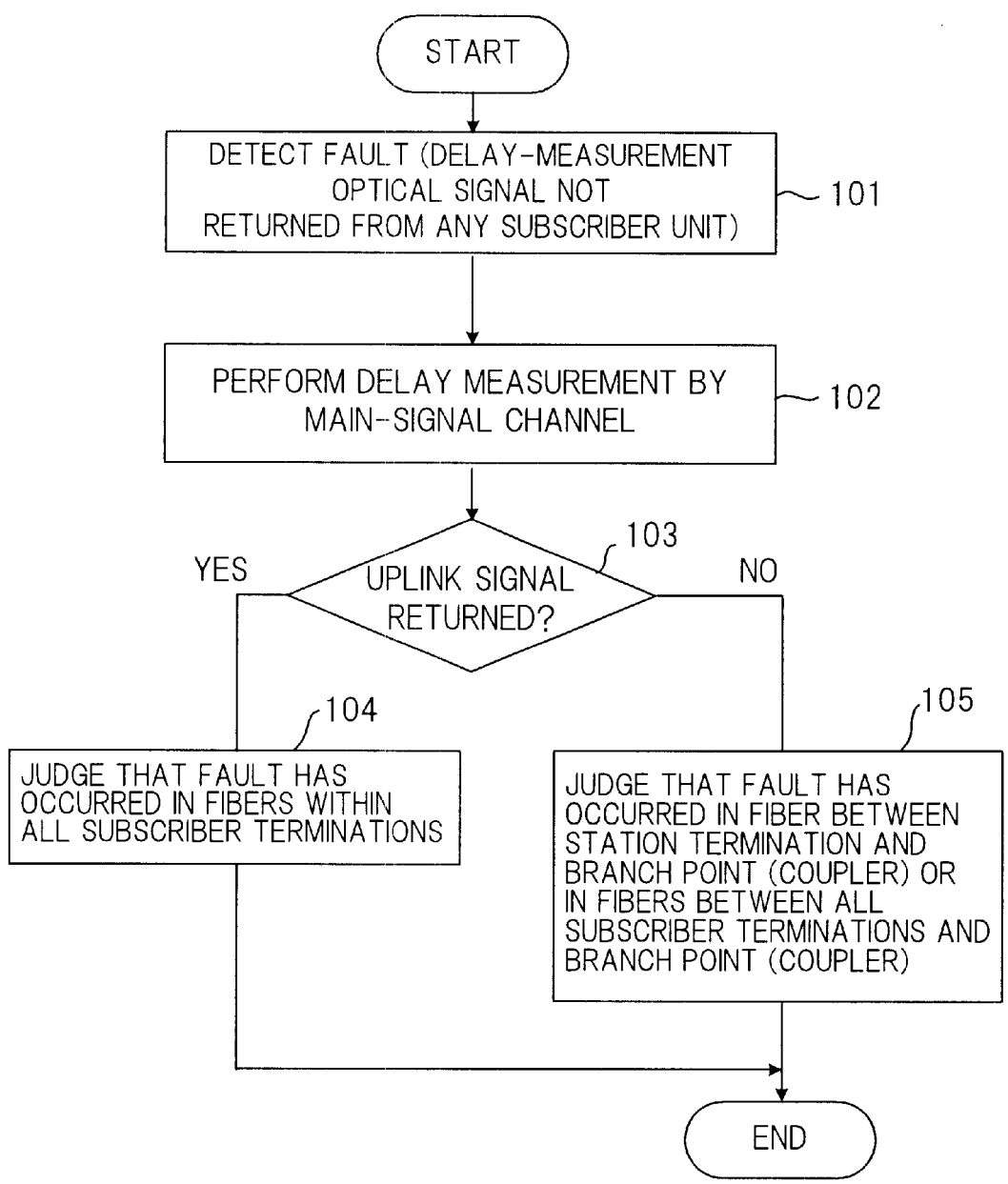
FIG. 10 is a flowchart of processing for identifying occurrence of a fault in a case where a delay-measurement optical signal is not returned from any subscriber unit.

FIG. 10 is a flowchart of processing for identifying occurrence of a fault location in a case where a delay-measurement optical signal is not returned from any subscriber unit at the time of delay measurement.

If a delay-measurement optical signal is not received from any subscriber unit at the time of delay measurement (step 101), delay measurement based upon the main-signal channel is performed (step 102). More specifically, the main unit 11b of the station (see FIG. 2) transmits a downlink signal, inclusive of a delay-measurement optical signal, to a prescribed subscriber unit. If a fault has occurred in the loop-back path within the subscriber unit, the above-mentioned downlink main signal arrives at the answer-signal return unit 38 within the subscriber unit. The delay-measurement optical signal detector 38a in the answer-signal return unit 38 detects the delay-measurement optical signal addressed to this subscriber unit, switches the selector 38e over to the memory 38d to halt the readout of the signal from the buffer 38c and read the answer signal out of the memory 38d instead. The answer signal enters the selector 38e and, as a result, is inserted into the downlink main signal and sent to the main unit 11b of the station.

The main unit 11b of the station checks to determine whether the answer signal has been received (step 103). If the answer signal has been received, the main unit judges that a fault has occurred in the loopback path (point Ci in FIG. 6) within the subscriber termination (step 104). If the answer signal has not been received, the main unit judges (1) that a fault has occurred in the optical transmission line 13a (at point A) between the station 11 and the star coupler 13a or (2) that a fault has occurred (at point Bi) between the star coupler 13a and the subscriber unit 12i (step 105).

FIG. 11 is a flowchart of processing for identifying occurrence of a fault location in a case where a delay-measurement optical signal is not returned from a specific subscriber unit at the time of delay measurement.

If a delay-measurement optical signal is not received from a specific subscriber unit at the time of delay measurement (step 201), delay measurement based upon the main-signal channel is performed (step 202). More specifically, the main unit 11b of the station (see FIG. 2) transmits a downlink signal, inclusive of a delay-measurement optical signal, to the specific subscriber unit. If a fault has occurred in the loopback path within the specific subscriber unit, the above-mentioned downlink main signal arrives at the answer-signal return unit 38 within the subscriber unit. The answer-signal return unit 38 inserts the answer signal into the downlink main signal and sends the downlink main signal to the main unit 11b of the station in the manner described above.

The main unit 11b of the station checks to determine whether the answer signal has been received (step 203). If the answer signal has been received, the main unit judges that a fault has occurred in the loopback path (point Ci in FIG. 6) within the specific subscriber termination (step 204). If the answer signal has not been received, the main unit judges that a fault has occurred (at point Bi) between the star coupler 13a and the specific subscriber unit 12 (step 205).

It is assumed in the foregoing description that a single wavelength $\lambda_0$ is the wavelength of the downlink main-signal channel. However, if a higher degree of wavelength multiplexing is employed, a plurality of wavelengths can be utilized as wavelengths of the downlink main-signal channel and the present invention can be applied to such as arrangement as well.

In accordance with the present invention, it is possible to measure transmission distances or delay times from a station to all subscribers at one time by changing, on a per-subscriber basis, a wavelength $\lambda_i$ for measurement of delay time. As a result, measurement time can be shortened and the measurement operation simplified.

In accordance with the present invention, it is possible to measure transmission distances or delay times from the station to all subscriber units at one time. Moreover, one or more subscribers can be specified at will and the delays associated only with these subscribers can be measured.

In accordance with the present invention, a subscriber need only extract a delay-measurement optical signal having a wavelength allocated to this subscriber, loop back the signal and return the signal to the optical transmission line. The delay-measurement optical signal can be looped back irrespective of whether the subscriber unit is currently operating. As a result, the station can measure delay without giving consideration to whether or not the subscriber unit is operating. Moreover, it is possible to improve the accuracy and reliability of delay measurement.

In accordance with the present invention, an optical coupler in a subscriber unit can be eliminated by connecting an isolator to a star coupler provided in the optical transmission line.

The present invention is so adapted that in response to non-arrival of delay-measurement optical signals from all subscribers upon elapse of a fixed period of time, it is possible to determine (1) whether a fault has occurred in the optical transmission line between a station and a star coupler or (2), in regard to all subscribers, whether faults have occurred in the optical transmission lines between the star coupler and all of the subscriber units or in the fibers within all of the subscriber units.

The present invention is so adapted that in case of non-arrival of a delay-measurement optical signal from a specific subscriber unit upon elapse of a fixed period of time, it is possible to determine (1) whether a failure has occurred in the optical transmission line between the star coupler and the subscriber unit or (2) whether a failure has occurred in the fiber within the subscriber unit.

In accordance with the present invention, means for measuring delay via a main-signal channel is provided within a station and subscriber unit. This makes it possible to identify the location of a fault in a case where delay-measurement optical signals do not arrive from any subscribers or from a specific subscriber.

As many apparently widely different embodiments of the present invention can be made without departing from the spirit and scope thereof, it is to be understood that the invention is not limited to the specific embodiments thereof except as defined in the appended claims.

What is claimed is:

1. A delay measurement method in an optical subscriber network having a station, a plurality of subscriber units and an optical transmission line through which optical signals are sent and received by the station and the plurality of subscriber units, comprising:

allocating wavelengths for delay time measurement to respective ones of the subscriber units;

wavelength-multiplexing delay measurement optical signals having said wavelengths and sending the multiplexed signals from the station to the optical transmission line, the number of wavelength-multiplexed delay-measurement optical signals being equivalent to the number of subscribers;

distributing the wavelength-multiplexed delay-measurement optical signals to each of the subscriber units via a coupler in the optical transmission line;

selecting in each subscriber unit, by wavelength selection, a delay-measurement optical signal having the wavelength that has been allocated to the subscriber unit, and looping back the selected optical signal;

combining the selected delay-measurement optical signals, which are sent back from each of the subscriber units, by the coupler in the transmission line and sending the combined signals to the station; and separating in the station, according to each subscriber unit by wavelength selection, the delay-measurement optical signals sent back, concurrently measuring delay times for the subscriber units, each delay time being a time difference between a delay-measurement optical signal that has been transmitted and a delay-measurement optical signal that has been received, and measuring transmission distance or delay time to each subscriber unit using the difference, wherein each subscriber unit has a corresponding counter in the station, each counter counting clock pulses from the time the delay-measurement optical signals are sent from the station until the delay-measurement optical signals return from the corresponding subscriber units.

2. An optical subscriber network having a station, a plurality of subscriber units and an optical transmission line through which optical signals are sent and received by the station and plurality of subscriber units, wherein said station comprises:

wavelength multiplexing/demultiplexing means for wavelength-multiplexing and sending, to the optical transmission line, delay-measurement optical signals having wavelengths allocated to respective ones of subscriber units, the number of wavelength-multiplexed delay-measurement optical signals being equivalent to the number of subscribers, and for demultiplexing, according to each-subscriber unit by wavelength selection, delay-measurement optical signals sent back from the subscriber units; and delay time measurement means for concurrently measuring delay times for the subscriber units, each delay time being a time difference between a delay-measurement optical signal that has been transmitted and a delay-measurement optical signal that has been received, wherein each subscriber unit has a corresponding counter in the station, each counter counting clock pulses from the time the delay-measurement optical signals are sent from the station until the delay-measurement optical signals return from the corresponding subscriber units;

said optical transmission line having a coupler for distributing the wavelength-multiplexed delay-measurement optical signals, which have been sent from said station, to each of the subscriber units, combining delay-measurement optical signals that return from each of the subscriber units and sending the combined signals to said station; and each subscriber unit comprising:

wavelength selection means for selecting a delay-measurement optical signal having the wavelength that has been allocated to a corresponding subscriber unit; and means for looping back and returning the delay-measurement optical signal to the optical transmission line.

3. The network according to claim 2, wherein said station further comprises:

optical transmitters transmitting delay-measurement optical signals having wavelengths allocated to respective ones of the subscriber units; and optical receivers receiving delay-measurement optical signals having wavelengths allocated to respective ones of the subscriber units, said delay time measurement means having a counter for measuring delay time for each subscriber unit by counting a clock generated from transmission of a delay-measurement optical signal to receipt of the delay-measurement optical signal.

4. The network according to claim 3, wherein said delay time measurement means comprises means for specifying one or more specific subscriber units and performing delay measurement in relation to the specific subscriber units only.

5. The network according to claim 2, wherein said subscriber unit comprises:

a fiber delay line delaying, by an amount equivalent to signal length, a delay-measurement optical signal that has been selected by said wavelength selection means;

an isolator connected to said fiber delay line transmitting a delay-measurement optical signal in one direction only; and an optical coupler as said means for looping back, transmitting the delay-measurement optical signal from said isolator to the optical transmission line.

6. The network according to claim 2, wherein said subscriber unit comprises:

an isolator transmitting a delay-measurement optical signal, which has been selected by said wavelength selection means, in one direction only; and an optical fiber as said means for looping back, transmitting the delay-measurement optical signal from said isolator to a star coupler provided in the optical transmission line.

7. The network according to claim 2, wherein said delay time measurement means comprises a default detector which, if a delay-measurement optical signal does not arrive from any subscriber unit upon elapse of a fixed period of time, judges that a fault has occurred in the transmission line between the station and said coupler, or that faults have occurred in transmission lines between said coupler and all of the subscriber units, or within all of the subscriber units.

8. The network according to claim 7, wherein said station comprises means for measuring delay by sending a delay-measurement optical signal via a main-signal channel and receiving an answer signal, which is in response to the delay-measurement optical signal, from a subscriber unit;

said subscriber unit comprises means for sending an answer signal back to the station via the main-signal channel when a delay-measurement optical signal has been received via the main-signal channel; and when it has been detected in said delay time measurement means that a delay-measurement optical signal has not arrived from any subscriber unit upon elapse of the fixed period of time, said station sends a delay-measurement optical signal to a prescribed subscriber unit via the main-signal channel, judges that a fault has occurred in a loopback path within said subscriber unit if an answer signal is sent back from said subscriber unit, and if an answer signal is not sent back from said subscriber unit, judges that a fault has occurred in the transmission line between the station and said coupler or that a fault has occurred in the transmission line between said coupler and said subscriber unit.

9. The network according to claim 2, wherein said delay time measurement means comprises a fault detector which, if a delay-measurement optical signal does not arrive from a specific subscriber unit upon elapse of a fixed period of time, judges that a fault has occurred in the transmission line between said coupler and the specific subscriber unit, or within the specific subscriber unit.

10. The network according to claim 9, wherein said station comprises means for measuring delay by sending a delay-measurement optical signal via a main-signal channel and receiving an answer signal, which is in response to the delay-measurement optical signal, from a subscriber unit;

said subscriber unit comprises means for sending an answer signal back to the station via the main-signal channel when a delay-measurement optical signal has been received via the main-signal channel; and when it has been detected in said delay time measurement means that a delay measurement optical signal has not arrived from a specific subscriber unit upon elapse of the fixed period of time, said station sends a delay-measurement optical signal to said subscriber unit via the main-signal channel, judges that a fault has occurred in a loopback path within said subscriber unit if an answer signal is sent back from said subscriber unit, and if an answer signal is not sent back from said subscriber unit, judges that a fault has occurred in the transmission line between said coupler and said subscriber unit.

11. An optical transmission apparatus within a station in an optical subscriber network in which a time delay to each of a plurality of subscriber units is measured, comprising:

optical transmitters transmitting delay-measurement optical signals having wavelengths allocated to respective ones of the subscriber units;

wavelength multiplexing/demultiplexing means for wavelength-multiplexing and sending, to an optical transmission line, the delay-measurement optical signals output by respective ones of said optical transmitters, the number of wavelength-multiplexed delay-measurement optical signals being equivalent to the number of subscribers, and for demultiplexing, according to each subscriber unit by wavelength selection, delay-measurement optical signals sent back from the subscriber units;

optical receivers for receiving delay-measurement optical signals having wavelengths allocated to respective ones of the subscriber units; and means for instructing each optical transmitter to send a delay-measurement optical signal, monitoring receipt of a delay-measurement optical signal by each optical receiver, and concurrently measuring delay times for the subscriber units, each delay time being a time from transmission of a delay measurement optical signal to reception of the delay measurement optical signal, wherein each subscriber unit has a corresponding counter in the station, each counter counting clock pulses from the time the delay-measurement optical signals are sent from the station until the delay-measurement optical signals return from the corresponding subscriber units.

12. An optical transmission apparatus within a subscriber unit in an optical subscriber network in which wavelengths for delay time measurement are allocated to respective ones of a plurality of subscriber units, delay-measurement optical signals having said wavelengths are wavelength-multiplexed and sent to an optical transmission line from a station, the number of wavelength-multiplexed delay measurement optical signals being equivalent to the number of subscribers, delay-measurement optical signals returned from each of the subscriber units are separated on a per-subscriber basis and time from transmission of a delay-measurement optical signal to receipt of the delay-measurement optical signal is measured as delay time on a per-subscriber basis, comprising:

an optical coupler connected to the optical transmission line;

wavelength selection means connected to said optical coupler for selecting a delay-measurement optical signal having the wavelength that has been allocated to this optical transmission apparatus;

a fiber delay line delaying, by an amount equivalent to signal length, a delay-measurement optical signal that has been selected by said wavelength selection means;

an isolator connected to said fiber delay line transmitting a delay-measurement optical signal in one direction only; and means for inputting a delay-measurement optical signal from isolator to said optical coupler, wherein each subscriber unit has a corresponding counter in the station, each counter counting clock pulses from the time the delay-measurement optical signals are sent from the station until the delay-measurement optical signals return from the corresponding subscriber units.

13. An optical subscriber network having a station, a plurality of subscriber units and an optical transmission line through which optical signals are sent and received by the station and plurality of subscriber units, wherein said station comprises:

a wavelength multiplexing/demultiplexing unit wavelength-multiplexing and sending, to the optical transmission line, delay-measurement optical signals having wavelengths allocated to respective ones of subscriber units, the number of wavelength-multiplexed delay-measurement optical signals being equivalent to the number of subscribers, and for demultiplexing, according to each subscriber unit by wavelength selection, delay-measurement optical signals sent back from the subscriber units; and a delay time measurement unit concurrently measuring delay times for the subscriber units, each delay time being a time difference between a delay-measurement optical signal that has been transmitted and a delay-measurement optical signal that has been received, the delay time measurement unit having counters corresponding to respective subscriber units, each counter counting clock pulses from the time the delay-measurement optical signals are sent from the station until the delay-measurement optical signals return from the corresponding subscriber units;

said optical transmission line having a coupler for distributing the wavelength-multiplexed delay-measurement optical signals, which have been sent from said station, to each of the subscriber units, combining delay-measurement optical signals that return from each of the subscriber units and sending the combined signals to said station; and each subscriber unit comprising:
   a wavelength selection unit selecting a delay-measurement optical signal having the wavelength that has been allocated to a corresponding subscriber unit; and
   a looping back unit looping back and returning the delay-measurement optical signal to the optical transmission line.

14. An optical transmission apparatus within a station in an optical subscriber network in which a time delay to each of a plurality of subscriber units is measured, comprising:

optical transmitters transmitting delay-measurement optical signals having wavelengths allocated to respective ones of the subscriber units;

a wavelength multiplexing/demultiplexing unit wavelength-multiplexing and sending, to an optical transmission line, the delay-measurement optical signals output by respective ones of said optical transmitters, the number of wavelength-multiplexed delay-measurement optical signals being equivalent to the number of subscribers, and for demultiplexing, according to each subscriber unit by wavelength selection, delay-measurement optical signals sent back from the subscriber units;

optical receivers for receiving delay-measurement optical signals having wavelengths allocated to respective ones of the subscriber units; and an instructing unit instructing each optical transmitter to send a delay-measurement optical signal, monitoring receipt of a delay-measurement optical signal by each optical receiver, and measuring delay times for the subscriber units, each delay time being a time from transmission of a delay measurement optical signal to reception of the delay measurement optical signal, wherein each subscriber unit has a corresponding counter in the station, each counter counting clock pulses from the time the delay-measurement optical signals are sent from the station until the delay-measurement optical signals return from the corresponding subscriber units.

15. An optical transmission apparatus within a subscriber unit in an optical subscriber network in which wavelengths for delay time measurement are allocated to respective ones of a plurality of subscriber units, delay-measurement optical signals having said wavelengths are wavelength-multiplexed and sent to an optical transmission line from a station, the number of wavelength-multiplexed delay measurement optical signals being equivalent to the number of subscribers, delay-measurement optical signals returned from each of the subscriber units are separated on a per-subscriber basis and time from transmission of a delay-measurement optical signal to receipt of the delay-measurement optical signal is measured as delay time on a per-subscriber basis, comprising:

an optical coupler connected to the optical transmission line;

a wavelength selection unit connected to said optical coupler selecting a delay-measurement optical signal having the wavelength that has been allocated to this optical transmission apparatus;

a fiber delay line delaying, by an amount equivalent to signal length, a delay-measurement optical signal that has been selected by said wavelength selection means;

an isolator connected to said fiber delay line transmitting a delay-measurement optical signal in one direction only; and an input unit inputting a delay-measurement optical signal from isolator to said optical coupler, wherein each subscriber unit has a corresponding counter in the station, each counter counting clock pulses from the time the delay-measurement optical signals are sent from the station until the delay-measurement optical signals return from the corresponding subscriber units.

16. A method of measuring delay time in an optical network, comprising:

wavelength-multiplexing a plurality of optical signals into a combined signal, each optical signal having a wavelength corresponding to a wavelength of one of a plurality of subscriber units;

transmitting the combined signal from a station to the subscriber units, and selecting, in each subscriber unit, a corresponding optical signal from the combined signal;

looping back, by each subscriber unit, the selected optical signal, combining the optical signals selected by each subscriber unit, and sending the combined selected optical signals to the station; and separating the combined selected optical signals and concurrently determining delay times for the subscriber units using corresponding returned optical signals from the combined selected optical signals, wherein each subscriber unit has a corresponding counter in the station, each counter counting clock pulses from the time the optical signals are sent from the station until the optical signals return from the corresponding subscriber units.

\* \* \* \* \*